(12) United States Patent
Zhao

(10) Patent No.: US 10,980,078 B2
(45) Date of Patent: Apr. 13, 2021

(54) METHOD AND DEVICE FOR CONTROLLING NETWORK CONNECTION OF APPLICATION TERMINAL

(71) Applicant: BOE TECHNOLOGY GROUP CO., LTD., Beijing (CN)

(72) Inventor: Junjie Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 232 days.

(21) Appl. No.: 15/539,793

(22) PCT Filed: May 13, 2016

(86) PCT No.: PCT/CN2016/082024
§ 371 (c)(1),
(2) Date: Jun. 26, 2017

(87) PCT Pub. No.: WO2017/152490
PCT Pub. Date: Sep. 14, 2017

(65) Prior Publication Data
US 2018/0092153 A1    Mar. 29, 2018

(30) Foreign Application Priority Data

Mar. 7, 2016 (CN) .......................... 201610128394.8

(51) Int. Cl.
*H04W 76/20* (2018.01)
*H04W 76/10* (2018.01)
(Continued)

(52) U.S. Cl.
CPC ........... *H04W 76/20* (2018.02); *H04W 4/023* (2013.01); *H04W 48/18* (2013.01); *H04W 76/10* (2018.02);
(Continued)

(58) Field of Classification Search
CPC ....... H04W 76/20; H04W 84/12; H04W 4/80; H04W 8/005; H04W 24/08; H04W 4/38;
(Continued)

(56) References Cited

U.S. PATENT DOCUMENTS 7,155,213 B1 * 12/2006 Almeda ............ H04M 1/72533
455/419
7,778,654 B2 * 8/2010 Ahn .................... H04L 12/2809
370/338

(Continued)

FOREIGN PATENT DOCUMENTS

CN    101175310 A    5/2008
CN    103718619 A    4/2014

OTHER PUBLICATIONS

International Search Report of PCT/CN2016/082024 in Chinese, dated Nov. 18, 2016 with English translation.
(Continued)

*Primary Examiner* — Sargon N Nano
(74) *Attorney, Agent, or Firm* — Collard & Roe, P.C.

(57) ABSTRACT

Disclosed are a method and a device for controlling network connection of an application terminal. The method includes: determining whether one or more connected equipments are equipments in the application terminal's equipment list; and controlling the network connection of said application terminal based on the determination result. Therefore, according to embodiments of the present disclosure, the application terminal may control network connection automatically according to connected equipments rather than always connecting the application terminal with the network, which reduces the risk of leaking user's data and at the same time reduces power consumption of the application terminal.

15 Claims, 7 Drawing Sheets

(51) Int. Cl.
   *H04W 88/16* (2009.01)
   *H04W 48/18* (2009.01)
   *H04W 76/14* (2018.01)
   *H04W 4/02* (2018.01)
   *H04W 84/10* (2009.01)

(52) U.S. Cl.
   CPC ........... *H04W 76/14* (2018.02); *H04W 84/10* (2013.01); *H04W 88/16* (2013.01); *Y02D 30/70* (2020.08)

(58) Field of Classification Search
   CPC . H04W 52/0216; H04W 64/00; H04W 48/16; H04W 48/18; H04W 76/30; H04W 38/0011; H04W 76/22; H04W 76/34; G06F 1/1694; H04L 12/2803; H04L 12/2809; H04M 1/72533; Y02D 70/142; Y02D 70/144; Y02D 70/162
   See application file for complete search history.

(56) References Cited

U.S. PATENT DOCUMENTS

| | | | |
|---|---|---|---|
| 8,831,678 B2 | 9/2014 | Doyle | |
| 2007/0218902 A1* | 9/2007 | Smyk | H04L 29/06027 455/436 |
| 2009/0002547 A1* | 1/2009 | Endo | H04N 1/00222 348/372 |
| 2009/0072991 A1* | 3/2009 | Hayashi | H04L 12/282 340/11.1 |
| 2009/0116441 A1* | 5/2009 | Park | H04W 48/18 370/329 |
| 2015/0019714 A1* | 1/2015 | Shaashua | H04L 12/2818 709/224 |
| 2015/0134954 A1* | 5/2015 | Walley | H04L 63/0823 713/168 |
| 2015/0222517 A1* | 8/2015 | McLaughlin | H04W 12/003 713/156 |
| 2015/0249672 A1* | 9/2015 | Burns | G06F 21/629 726/4 |
| 2015/0286388 A1* | 10/2015 | Jeon | G06F 3/0484 715/736 |
| 2016/0014772 A1* | 1/2016 | Suresh | H04W 72/0446 370/337 |
| 2016/0173450 A1* | 6/2016 | Mircescu | H04L 63/0272 726/14 |
| 2016/0198285 A1* | 7/2016 | Lin | H04L 67/12 709/209 |
| 2016/0323283 A1* | 11/2016 | Kang | H04L 63/08 |
| 2016/0381144 A1* | 12/2016 | Malik | H04W 4/70 455/517 |
| 2017/0019443 A1* | 1/2017 | Conan | H04N 21/8186 |
| 2017/0026195 A1* | 1/2017 | Pan | H04L 12/282 |
| 2017/0134553 A1* | 5/2017 | Jeon | H04W 4/70 |
| 2017/0195046 A1* | 7/2017 | Cheon | H04B 10/073 |

OTHER PUBLICATIONS

Notice of Transmittal of the International Search Report of PCT/CN2016/082024 in Chinese, dated Nov. 18, 2016.
Written Opinion of the International Searching Authority of PCT/CN2016/082024 in Chinese, dated Nov. 18, 2016 with English translation.

* cited by examiner

METHOD AND DEVICE FOR CONTROLLING NETWORK CONNECTION OF APPLICATION TERMINAL

CROSS REFERENCE TO RELATED APPLICATIONS

This application is the National Stage of PCT/CN2016/082024 filed on PCT/CN2016/082024, which claims priority under 35 U.S.C. § 119 of Chinese Application No. 201610128394.8 filed on Mar. 7, 2016, the disclosure of which is incorporated by reference.

TECHNICAL FIELD

Embodiments of the present disclosure relate to a method and a device for controlling network connection of an application terminal.

BACKGROUND

With the development of internet of things and mobile internet technology, the kinds and functions of application terminals have increased dramatically. In the age of interconnected things, an application terminal generally has the network connection function that allows connection at any time and everywhere via the Internet of Things, and another equipment may be connected to the application terminal equipment remotely, thereby realizing functions such as remote monitoring, remote opening, remote turning on microwave oven.

However, the connection between the application terminal and the network is always in the On state at present, since the application terminal is generally installed in a private site such as living room or bedroom, there is the risk of leaking user's privacy and potential security risk.

Therefore, it is desired to have a scheme of automatically controlling network connection of an application terminal to protect user's privacy.

SUMMARY

A method for controlling a network connection of an application terminal is provided in the embodiments of this disclosure, comprising: determining whether one or more connected equipments are equipments in the application terminal's equipment list; and controlling the network connection of the application terminal based on the determination result.

In one example, the determining whether one or more connected equipments are equipments in the application terminal's equipment list comprises: determining whether information on the one or more equipments is included in the application terminal's equipment list; and when information on the equipments is included in the application terminal's equipment list, determining that the equipments are equipments in the application terminal's equipment list.

In one example, further comprising: obtaining information on one or more connected equipments; and obtaining the application terminal's equipment list.

In one example, controlling the application terminal's network connection comprises controlling the application terminal's network connection to be in Off state or On state based on the determination result.

In one example, when at least one in the one or more connected equipments are equipments in the application terminal's equipment list, the network connection of the application terminal is disconnected.

In one example, when all equipments in the application terminal's equipment list are connected, the network connection of the application terminal is disconnected.

In one example, further comprising after the disconnecting the network connection of the application terminal: when at least one of equipments in the application terminal's equipment list is not connected, controlling the network connection of the application terminal to be in On state.

In one example, when all equipments in the application terminal's equipment list are not connected, controlling the network connection of the application terminal to be in On state.

In one example, information on the one or more connected equipments is saved at a gateway.

In one example, wherein information on the one or more connected equipments is kept at the application terminal.

In one example, the application terminal's equipment list is saved at a server.

In one example, the application terminal's equipment list is saved in the application terminal.

In one example, the method is executed at the gateway.

In one example, the method is executed at the application terminal.

In one example, the one or more connected equipments are connected with the application terminal via a local area network or short-range communication.

A method for controlling a network connection of an application terminal is provided in embodiments of this disclosure, comprising: determining distances between one or more equipments and the application terminal; and controlling the network connection of the application terminal based on the determined distances.

In one example, the one or more equipments are equipments in the application terminal's equipment list.

In one example, further comprising: determining whether the one or more equipments are equipments in the application terminal's equipment list.

In one example, the determining whether the one or more equipments are equipments in the application terminal's equipment list comprises: determining whether information on the one or more equipments is included in the application terminal's equipment list; and when information on the equipments is included in the application terminal's equipment list, determining that the equipments are equipments in the application terminal's equipment list.

In one example, further comprising: obtaining information on the one or more equipments; and obtaining the application terminal's equipment list.

In one example, controlling the application terminal's network connection comprises controlling the application terminal's network connection to be in Off state or On state based on the determined distances.

In one example, when the determined distance is less than or equal to a predetermined threshold, the network connection of the application terminal is disconnected.

In one example, the disconnecting the network connection of the application terminal comprises: when at least one in the one or more equipments are equipments in the application terminal's equipment list, the network connection of the application terminal is disconnected.

In one example, when distances between all equipments in the application terminal's equipment list and the application terminal are less than or equal to a predetermined threshold, the network connection of the application terminal is disconnected.

In one example, further comprising after the disconnecting the network connection of the application terminal: when a distance between at least one of equipments in the application terminal's equipment list and the application terminal is greater than a predetermined threshold, controlling the network connection of the application terminal to be in On state.

In one example, when distances between all equipments in the application terminal's equipment list and the application terminal are greater than the predetermined threshold, controlling the network connection of the application terminal to be in On state.

In one example, information on respective equipments is obtained from the one or more equipments.

In one example, the application terminal's equipment list is saved at a server.

In one example, the application terminal's equipment list is saved in the application terminal.

In one example, the method is executed at the gateway.

In one example, the method is executed at the application terminal.

A device for controlling a network connection of an application terminal is provided in the embodiments of this disclosure, comprising: determination component, configured to determine whether one or more connected equipments are equipments in the application terminal's equipment list; and control component, configured to control the network connection of the application terminal based on the determination result.

In one example, the determination component determines whether information on the one or more equipments is included in the application terminal's equipment list; and determines that the equipment is the one in the application terminal's equipment list when the information on the equipment is included in the application terminal's equipment list.

In one example, the determination component further obtains information on one or more connected equipments and obtains the application terminal's equipment list.

In one example, the control component controls the network connection of the application terminal to be in Off or On state based on the determination result.

In one example, when the determination component determines that at least one of the one or more connected equipments are equipments in the application terminal's equipment list, the control component disconnects the network connection of the application terminal.

In one example, when the determination component determines that all equipments in the application terminal's equipment list are connected, the control component disconnects the network connection of the application terminal.

In one example, after the control component disconnects the network connection of the application terminal, when the determination component determines that at least one of equipments in the application terminal's equipment list are not connected, the control component controls the network connection of the application terminal to be in On state.

In one example, when the determination component determines that all equipments in the application terminal's equipment list are not connected, the control component controls the network connection of the application terminal to be in On state.

In one example, information on the one or more connected equipments is saved at a gateway.

In one example, information on the one or more connected equipments is kept at the application terminal.

In one example, the application terminal's equipment list is saved at a server.

In one example, the application terminal's equipment list is saved in the application terminal.

In one example, the device is configured in the gateway.

In one example, the device is provided in the application terminal.

In one example, the one or more connected equipments are connected with the application terminal via a local area network or short-range communication.

Therefore, according to the embodiments of the present disclosure, it is possible to control network connection of an application terminal rather than always connecting the application terminal with the network, thereby reducing the risk of leaking user's data.

BRIEF DESCRIPTION OF DRAWINGS

The present disclosure will be understood more easily through the detail description below with reference to accompanying drawings, wherein same marks specify units of the same structure and wherein.

DETAIL DESCRIPTION

The technical proposal in embodiments of the present disclosure will be described clearly and completely below with respect to accompanying drawings in embodiments of the present disclosure and it is to be understood that the described embodiments are a part of embodiments of the present disclosure rather than all embodiments. Based on the embodiments of the present disclosure, all other embodiments obtained by one skilled in the art without any creative labor belong to the scope of the present disclosure.

Figure 1:
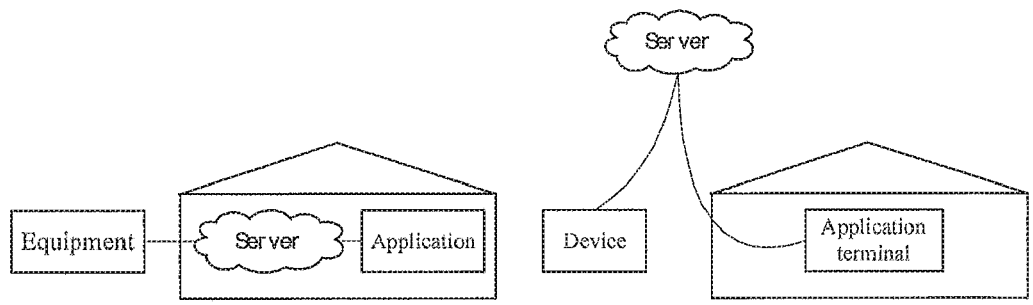
FIG. 1 shows two schematic connection modes for an equipment to control an application terminal remotely.

FIG. 1 shows two schematic connection modes for an equipment to remotely control an application terminal, in which the left diagram of FIG. 1 shows the connection mode for a local server and the right diagram of FIG. 1 shows the connection mode for a remote server.

As shown in FIG. 1, for either the connection mode for local server or the connection mode for remote server, the network connection of the application terminal is always in the activated state such that other malice users can control the application terminal and obtain the data of the application terminal at any time by accessing the server, which introduces the risk of leaking user's privacy and increases power consumption of the application terminal at the same time.

Figure 2:
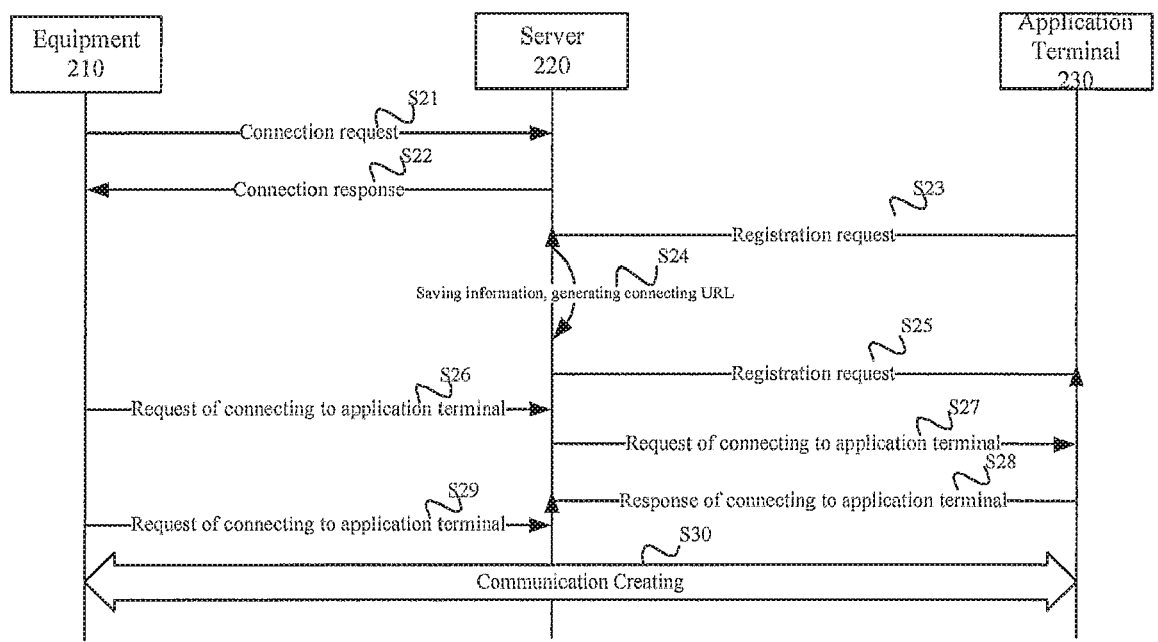
FIG. 2 shows a schematic signal flow when an equipment is establishing connection with an application terminal.

FIG. 2 shows a schematic signal flow when an equipment is establishing connection with an application terminal.

As shown in FIG. 2, in S21, the equipment 210 transmits a connection request to the server 220 and in S22, the server 220 returns a connection response to the equipment 210. In S23, the application terminal 230 transmits a registration request to the server 220. In S24, the server 220 saves information and generates a uniform resource locator (URL) of the connection. Then, in S25, the server 220 returns a registration response to the application terminal 230.

In order to establish connection with the application terminal 230, in S26, the equipment 210 transmits an application terminal connection request to the server 220. In S27, the server 220 forwards (transmits) the application terminal connection request to the application terminal 230. After receiving the request, the application terminal 230 transmits the application terminal connection response to the server 220 in S28 and the server 220 forwards (transmits) the response to the equipment 210 in S29. Thereby, in S30, the equipment 210 and the application terminal 230 establish a connection via the server 220 and start a session.

In the signal flow shown in FIG. 2, s21 to S25 are the registration process and S26 to S30 are the connection process.

After the equipment 210 and the application terminal 230 establish the session connection, when the equipment 210 actively disconnect or the network is in abnormality, the session connection between the equipment 210 and the application terminal 230 will be broken, however the network connection of the application terminal is always in the activated state to wait for connection by the equipment 210. Here, there is also a gateway between the application terminal 230 and the server 220.

As before, when an application terminal such as a camera is installed in a private site such as the living room or the bed room, if the network connection of the application terminal is always maintained, there will be a risk of leaking user's privacy and a potential security risk.

Figure 3:
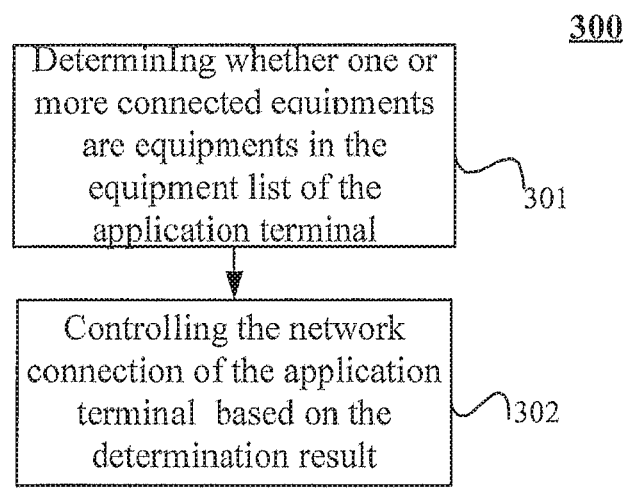
FIG. 3 shows a flow chart of a method for controlling network connection of an application terminal according to an embodiment of the present disclosure.

FIG. 3 shows a flow chart of a method 300 for controlling network connection of an application terminal according to an embodiment of the present disclosure.

As shown in FIG. 3, in the method 300, in 301, it is determined whether one or more connected equipments are equipments in the equipment list of the application terminal and in 302, the network connection of the application terminal is controlled based on the determination result.

Herein, one or more connected equipments may be equipments connected with the application terminal via a local area network or a short-range communication scheme. The short-range communication scheme may include direct WiFi connection, Bluetooth, ZigBee, infrared communication etc.

The application terminal equipment list may indicate the list of all equipments associated with the application terminal, including data and/or information on equipments having connected with the application terminal and/or equipments having been authenticated with the application terminal. The application terminal equipment list may be the form of list, or may be any other appropriate form such as plain text etc.

Therefore, according to embodiments of the present disclosure, by detecting whether the equipment connected with the application terminal is in the application terminal equipment list, when the equipment is in the same local area network as the application terminal or the equipment is in short-range communication with the application terminal, it is possible to control the application terminal's network connection rather than always connecting the application terminal with the network, thereby reducing the risk of leaking the user's data.

In one example, controlling the application terminal's network connection includes controlling said application terminal's network connection to be in off state or on state based on the determination result.

In one example, when determining whether one or more connected equipments are those in the application terminal equipment list, it may be to determine whether information on said one or more equipments is included in the application terminal equipment list and when the information on the equipments is included in the application terminal equipment list, it is determined that the equipments are those in the application terminal equipment list.

In another example, before determining whether information on said one or more equipments is included in the application terminal's equipment list, it is also possible to obtain information on one or more connected equipments and obtain the application terminal equipment list.

Herein, information on the equipment may include the equipment's equipment name, unique identifier, media access control (MAC) address and any other data that may uniquely identify the equipment. The application terminal equipment list may include the above-mentioned data, and may further include other extra data such as history connection information between the equipment and the application terminal. Of course, those skilled in the art should understand that embodiments of the present disclosure are not limited thereto.

Furthermore, herein, "equipment" may include any device that can establish connection with the application terminal such as a mobile equipment such as a smart phone, a tablet personal computer (PC), a laptop PC, a mobile telephone, a video phone, a personal digital assistant (PDA), a e-book reader etc., or an equipment of Internet of Things such as a vehicle, e.g., a car, a bicycle, a motorcycle and an aircraft.

Furthermore, herein, the "application terminal" may include any device with network connection such as a camera, an air conditioner, a washing machine, a refrigerator, an electric lamp, a TV set, a telephone etc., or an fixed equipment such as a desktop PC, a workstation and other servers.

In one example, when at least one in the connected one or more equipments is one in the application terminal equipment list, the network connection of the application terminal is disconnected. For example, it may be configured that so long as one equipment in the application terminal's equipment list is connected with the application terminal, the network connection of the application terminal is disconnected. Furthermore, it is also possible to set a threshold number, and when a number greater than the threshold of equipments in the application terminal's equipment list are connected with the application terminal, the network connection of the application terminal is disconnected. Furthermore, it is also possible to set one or more equipments in the terminal's equipment list as specified equipment(s), and only when the specified equipment(s) are connected with the application terminal, the network connection of the application terminal is disconnected regardless whether other equipments are connected.

In another example, when all equipments in the application terminal's equipment list are connected, it is possible to disconnect the network connection of the application terminal.

Therefore, according to the embodiment of the present disclosure, it is possible to control disconnection of the network connection of the application terminal according to the connected equipments rather than leaving the terminal's network connection in the on state, thereby reducing the power consumption and saving the energy.

In another example, after disconnecting the network connection of the application terminal, it is possible to further determine that when at least one in equipments in the application terminal's equipment list is not connected, the network connection of the application terminal is controlled to be in on state. Similarly, for example, it may be configured that so long as one equipment in the application terminal's equipment list is not connected with the application terminal, the network connection of the application terminal is in on state. Furthermore, it is also possible to set a threshold number, and when a number greater than the threshold of equipments in the application terminal's equipment list are not connected with the application terminal, the network connection of the application terminal is in on state. Furthermore, it is also possible to set one or more equipments in the terminal's equipment list as specified equipment(s), and when the specified equipment(s) are not connected with the application terminal, the network connection of the application terminal is in on state regardless whether other equipments are connected.

In another example, when all equipments in the application terminal's equipment list are not connected, the network connection of the application terminal is controlled to be in on state.

Hereinafter, specific implementations of the present disclosure will be described in detail with reference to accompanying drawings.

Figure 4:
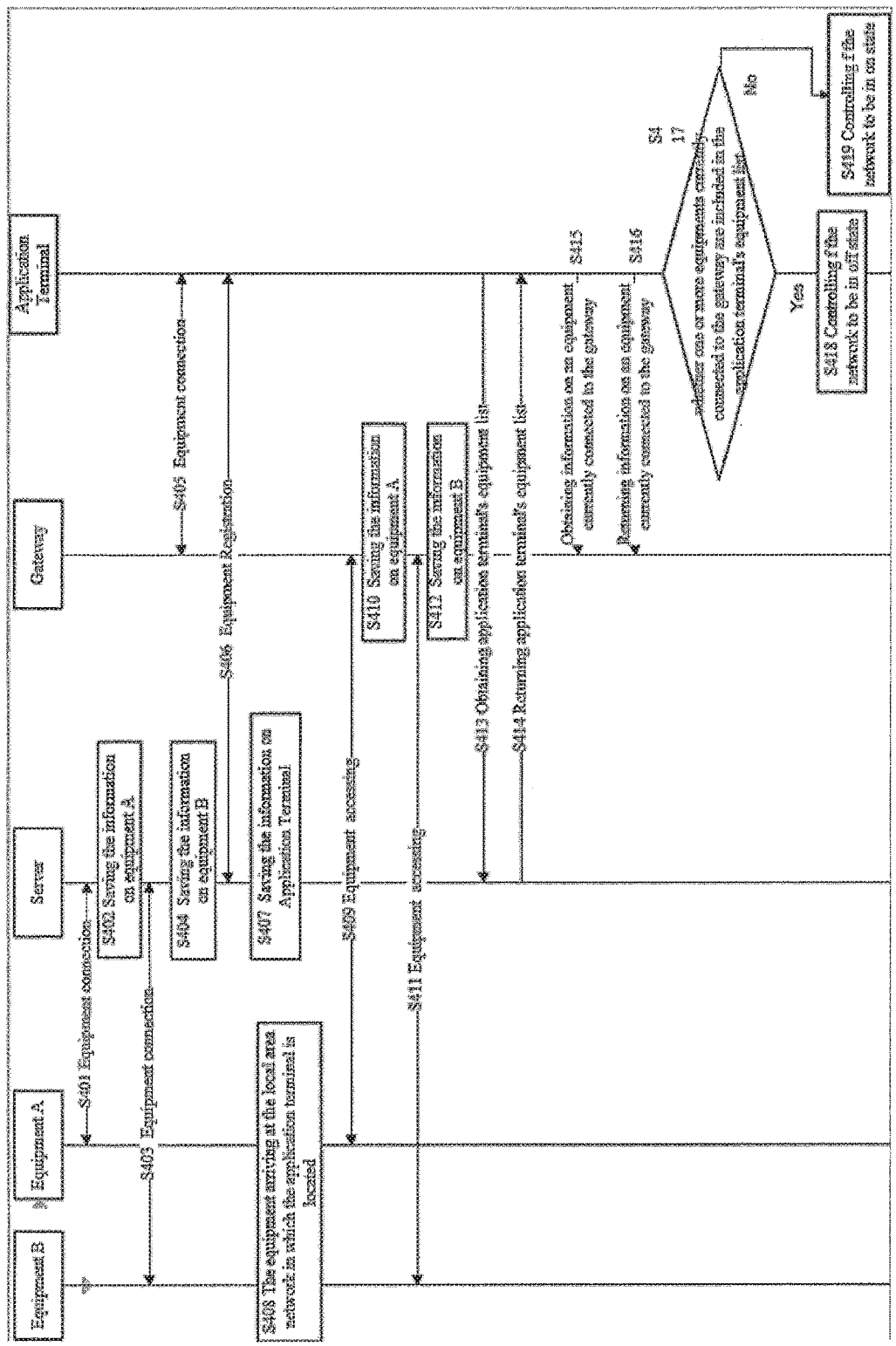
FIG. 4 shows a schematic signal flow of a first implementation according to an embodiment of the present disclosure.

FIG. 4 shows a schematic signal flow of a first implementation according to an embodiment of the present disclosure. In the first implementation, the application terminal's equipment list is saved at the server, information on the one or more connected equipments is saved at the gateway and the application terminal determines whether the connected equipments and the application terminal are in the same local area network.

FIG. 4 shows equipment A and equipment B and assumes that equipment A and equipment B are both equipments in the application terminal's equipment list and equipments in the application terminal's equipment list includes only equipment A and equipment B. However, it is obvious that the number of equipments may be more than or less than two.

As shown in FIG. 4, in S401, equipment A initiates an equipment connection to the server, and the server saves the information on equipment A in S402, by for example creating CSEBase1/<AE1> resource. In S403, the equipment B initiates an equipment connection to the server, and the server saves information on the equipment B in S404 by for example creating CSEBase1/<AE2> resource. Furthermore, in S405, the application terminal initiates an equipment connection to the gateway and the gateway transmits an equipment login request of the application terminal to the server and the server saves information on the application terminal in S407 by for example creating CSEBase1/<AE3> resource. It is understood that the connection process of equipment A and B to the server and the equipment login process of the application terminal to the server may occur in any order rather than being limited to the order shown in the figure.

In S408, the equipment arrives at the local area network in which the application terminal is located. In S409, equipment A accesses the gateway and the gateway saves information on equipment A in S410. In S411, equipment B accesses the gateway and the gateway saves information on equipment B in S412. Here, equipment A and equipment B communicate with the application terminal via the local area network.

In S413, the application terminal transmits a request for obtaining application terminal's equipment list to the server by for example Retrieve (CSEBase1/AE) and the server returns the application terminal's equipment list to the application terminal in S414. The application terminal may execute S413 to S414 at any time to obtain the application terminal's equipment list. For example, it may obtain the application terminal's equipment list immediately after registering with the server, or may also execute S413 to S414 periodically to obtain the newest equipment list of the application terminal.

Furthermore, when the application terminal's equipment list is saved in the application terminal, S413 to S414 may be omitted.

In S415, the application terminal transmits a request for obtaining information on an equipment currently connected to the gateway by for example UPnP::GetConnectClients( ). In S416, the gateway returns information on (one or more) equipments currently connected to the gateway to the application terminal. Then, at the application terminal, in S417, the application terminal determines whether one or more equipments currently connected to the gateway are included in the application terminal's equipment list. If so, the application terminal indicates the gateway to control the disconnection of the network connection of the application terminal in S418 by for example UPnP::ForceTermination( ). That is, now the network connection of the application terminal is in an off state. Otherwise, in S419, the network connection of the application terminal is controlled to be in on state, namely it remains connected with the network.

It is possible to execute process of S415 to S417 periodically to detect equipments connected to the gateway continuously. It is possible to set a predetermined time interval for executing S415 to S417 periodically. As described before, in S417, it is possible to disconnect the network connection of the application terminal when at least one equipment in the application terminal's equipment list is connected, and it is also possible to disconnect the network connection of the application terminal when all equipments in the application terminal's equipment list are connected.

Therefore, it can be seen that according to embodiments of the present disclosure, when an equipment is in a same local area network as the application terminal and communicate through the local area network, it is possible to disconnect the network connection of the application terminal rather than always connecting the terminal with the network, thereby reducing the risk of leaking user's data. Furthermore, disconnecting the network connection of the application terminal may also reduce the power consumption of the application terminal.

Furthermore, after S418, it is also possible that when at least one in equipments in the application terminal's equipment list is not connected, the network connection of the application terminal is controlled to be in on state, that is, it is possible to turn on the network connection of the application terminal.

Alternatively, it is possible to turn on network connection of the application terminal when all equipments in the application terminal's equipment list are not connected.

For example, after the network connection of the application terminal is disconnected, when equipment A or equipment B leaves the local area network to which the application terminal belongs, it is possible to configure to turn on network connection of the application terminal when at least one of equipment A and equipment B is not connected. In particularly, it is also possible to configure to turn on the network connection of the application terminal when both equipment A and equipment B are not connected.

Figure 5:
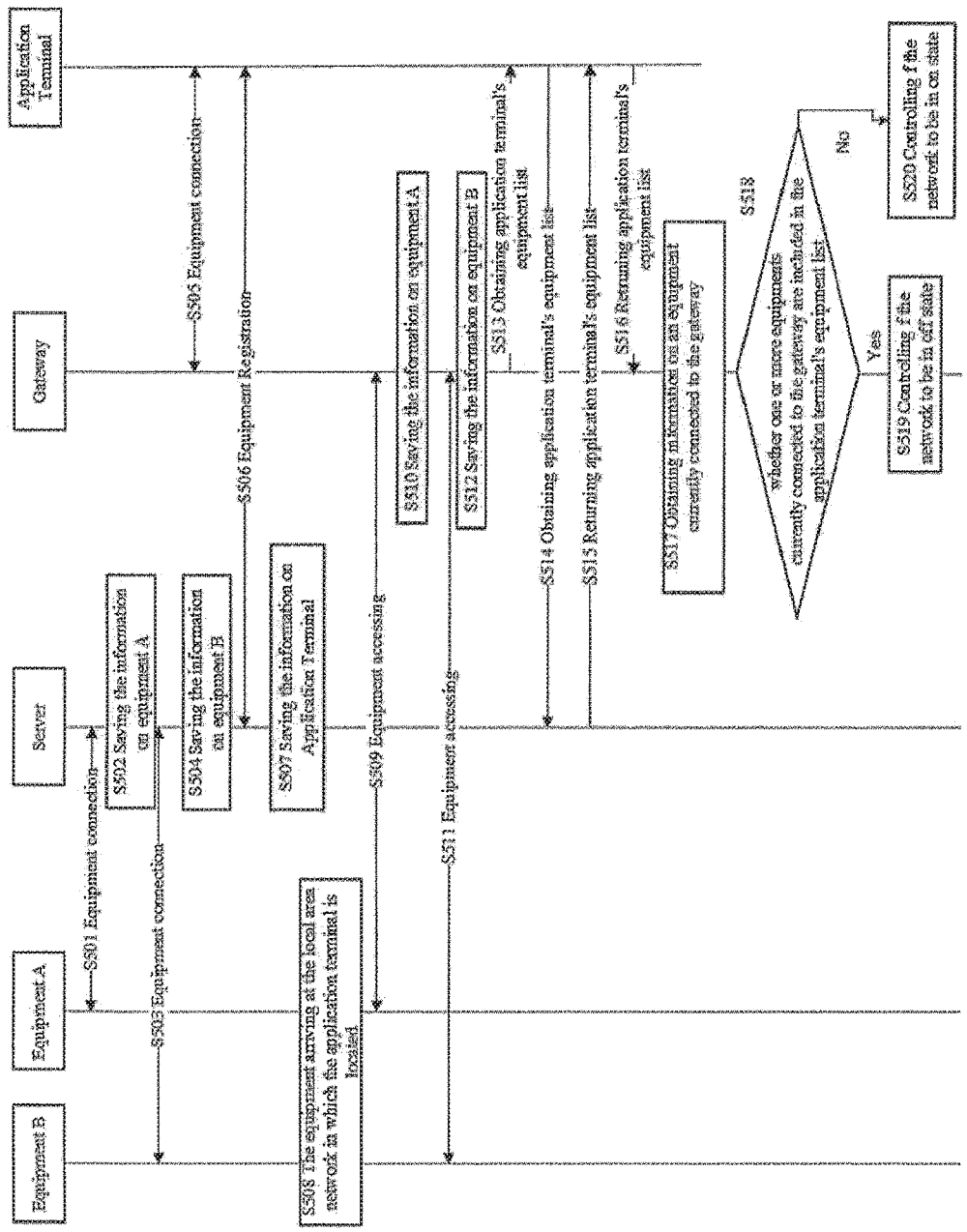
FIG. 5 shows a schematic signal flow of a second implementation according to an embodiment of the present disclosure.

FIG. 5 shows a schematic signal flow of a second implementation according to an embodiment of the present disclosure. In the second implementation, the application terminal's equipment list is saved at the server, information on the one or more connected equipments is saved at the gateway and the gateway determines whether the connected equipments and the application terminal are in the same local area network.

FIG. 5 still shows equipment A and equipment B, however the number of equipments may be more than or less than two.

S501 to S512 shown in FIG. 5 correspond to S401 to S412 shown in FIG. 4 respectively and will not be described any more here for concision of description.

In S513, the gateway transmits a request for obtaining application terminal's equipment list to the application terminal and in S514, the application terminal transmits a request for obtaining the application terminal's equipment list to the server, and in S515, the server returns the application terminal's equipment list to the application terminal, thereby the application terminal returns the application terminal's equipment list to the gateway in S516. The gateway may execute S513 at any time to obtain the application terminal's equipment list. For example, it may obtain the application terminal's equipment list immediately after application terminal registering with the server, or may also execute S513 periodically to obtain the newest equipment list of the application terminal.

Furthermore, when the application terminal's equipment list is saved in the application terminal, s514 to S515 may be omitted.

In S517, the gateway obtains information on equipments currently connected to the gateway by for example retrieving information on these equipments from memory of their own. Then, in S518, the gateway determines whether one or more equipments currently connected to the gateway are included in the application terminal's equipment list. If so, the gateway controls the network connection of the application terminal to be disconnected in S519, that is, the network connection of the application terminal is in off state. Otherwise, in S520, the network connection of the application terminal is controlled to be in on state, namely it remains being connected with the network.

It is possible to execute process of S517 to S518 periodically to detect equipments connected to the gateway continuously. It is possible to set a predetermined time interval in the gateway for which S517 to S518 are executed periodically.

As described before, in S518, it is possible to disconnect the network connection of the application terminal when at least one equipment in the application terminal's equipment list is connected, and it is also possible to disconnect the network connection of the application terminal when all equipments in the application terminal's equipment list are connected.

Therefore, it can be seen that according to embodiments of the present disclosure, when an equipment is in a same local area network as the application terminal and communicate through the local area network, it is possible to disconnect the network connection of the application terminal rather than always connecting the terminal with the network, thereby reducing the risk of leaking user's data. Furthermore, disconnecting the network connection of the application terminal may also reduce the power consumption of the application terminal.

Figure 6:
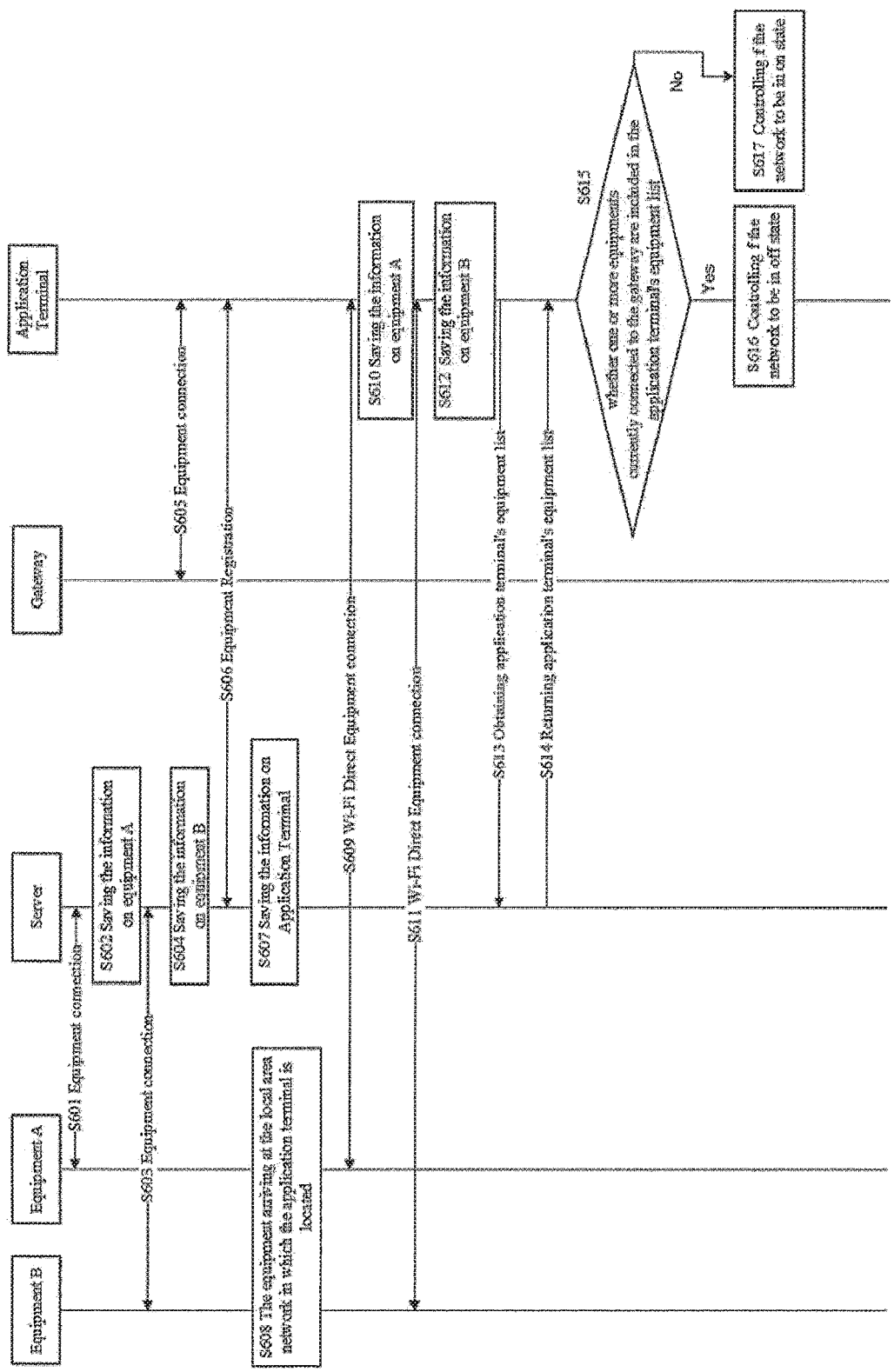
FIG. 6 shows a schematic signal flow of a third implementation according to an embodiment of the present disclosure.

FIG. 6 shows a schematic signal flow of a third implementation according to an embodiment of the present disclosure. In the third implementation, the application terminal's equipment list is saved at the server, information on the one or more equipments that have been already connected is saved at the application terminal and the application terminal determines whether the equipment connected with short-range communication is in the application terminal's equipment list.

In FIG. 6, equipment A and equipment B are still shown, however the number of equipments may be more or less than two.

S601 to S608 shown in FIG. 6 correspond to S401 to S408 shown in FIG. 4 respectively and will not be described any more here for concision of description.

In S609, equipment A initiates short-range communication to the application terminal and in S610, the application terminal saves information on equipment A. In S611, equipment B initiates short-range communication to the application terminal and in S612, the application terminal saves information on equipment B. Here, both equipment A and equipment B communicate with the application terminal via short-range communication. Although in FIG. 6, short-range communication between equipment a and equipment B and the application terminal is shown as WiFi direct, it is understood that the short-range communication may also be Bluetooth, BigZee, infrared etc., and the short-range communication scheme between equipment A and application terminal may be same as or different from that between equipment B and the application terminal.

In S613, the application terminal transmits a request for obtaining application terminal's equipment list to the server and the server returns the application terminal's equipment list to the application terminal in S614. The application terminal may execute S613 and S614 to obtain the application terminal's equipment list in any time. For example, it may obtain the application terminal's equipment list immediately after the application terminal registers with the server, or may also execute S613 and S614 periodically to obtain the newest equipment list of the application terminal.

Furthermore, when the application terminal's equipment list is saved in the application terminal, s613 to S614 may be omitted.

In S615, the application terminal determines whether one or more equipments connected thereto are included in the application terminal's equipment list. If so, in S616, network connection of the application terminal is controlled to be in off state, namely, disconnecting the network connection of the application terminal. If not, in S617, the network connection of the application terminal is controlled to be in on state, namely maintaining the network connection.

Furthermore, before s615, the application terminal may also execute an operation for obtaining information on equipments connected thereto, for example, retrieving relevant information from the memory of its own.

It is possible to execute the process of S615 periodically to detect equipments connected to the application terminal continuously. It is possible to set a predetermined time interval in the application terminal for which S615 is executed periodically.

As described before, in S615, it is possible to disconnect the network connection of the application terminal when at least one equipment in the application terminal's equipment list is connected, and it is also possible to disconnect the network connection of the application terminal when all equipments in the application terminal's equipment list are connected.

Therefore, it can be seen that according to embodiments of the present disclosure, when an equipment is communicating with the application terminal via short-range communication scheme, it is possible to disconnect network connection of the application terminal rather than always connecting the application terminal with the network, thereby reducing the risk of leaking user's data. Furthermore, disconnecting the network connection of the application terminal may also reduce the power consumption of the application terminal.

Figure 7:
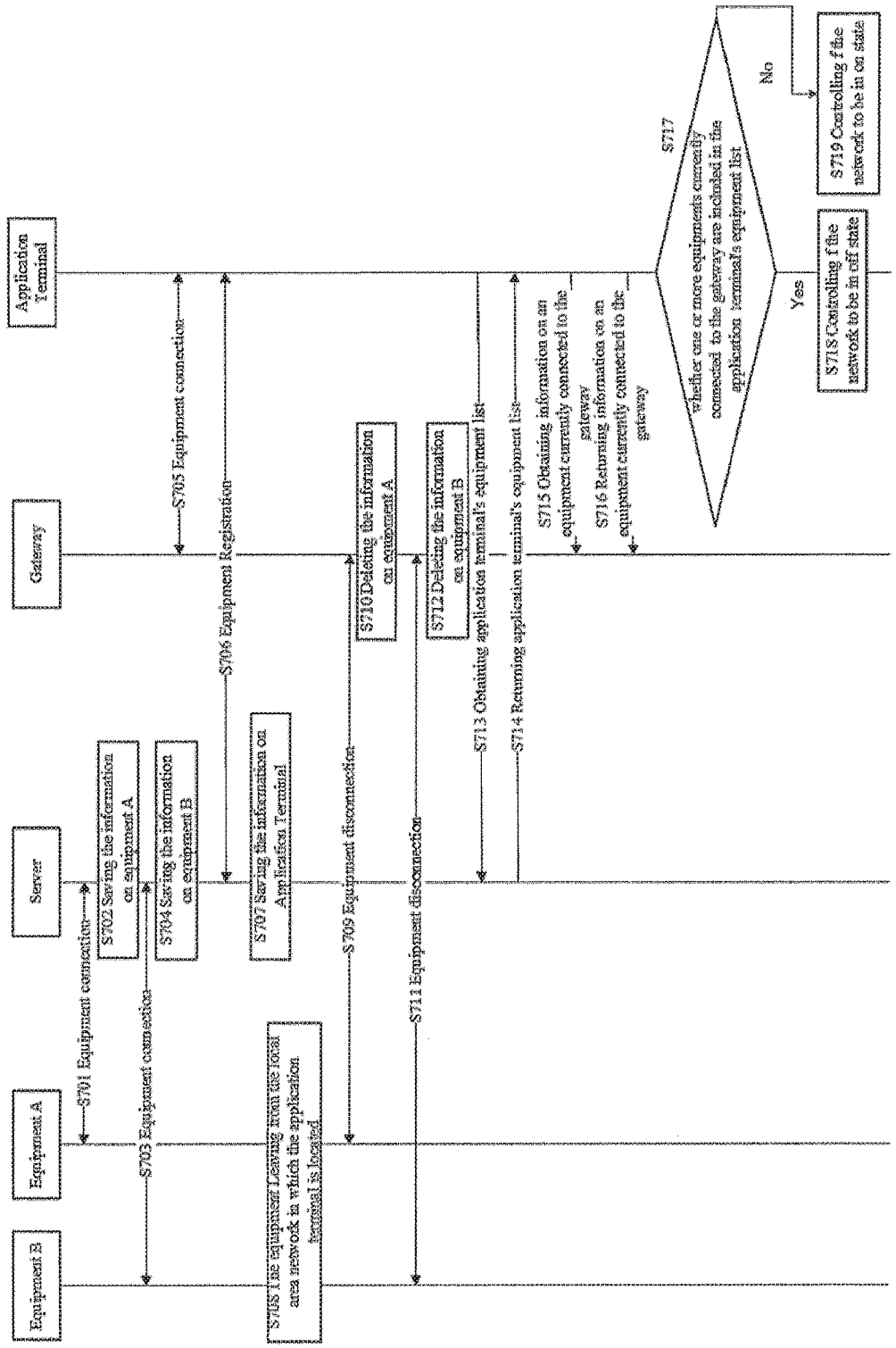
FIG. 7 shows a schematic signal flow of a fourth implementation according to an embodiment of the present disclosure.

FIG. 7 shows a schematic signal flow of a fourth implementation according to an embodiment of the present disclosure. In the fourth implementation, the application terminal's equipment list is saved at the server, information on the one or more equipments that have been already connected is saved at the gateway and the application terminal determines whether the connected equipments and the application terminal are in the same local area network.

Similarly, in FIG. 7, equipment A and equipment B are shown, however the number of equipments may be more or less than two.

S701 to S707 shown in FIG. 7 correspond to S401 to S407 shown in FIG. 4 respectively and will not be described any more here for concision of description. It is understood that the connection process of equipment A and B to the server and the equipment login process of the application terminal to the server may occur in any order rather than being limited to the order shown in the figure.

What is different from the implementation shown in FIG. 4 is that in FIG. 7, equipment A and equipment B leave the local area network in which the application terminal is located. Therefore, the information on equipments currently connected to the gateway does not include information on equipment A and equipment B.

In S708, the equipment leaves the local area network in which the application terminal is located. In S709, the equipment A's network connection is disconnected and information on equipment A is deleted at the gateway in S710. In S711, the equipment B's network connection is disconnected and information on equipment B is deleted at the gateway in S712. Here, equipment A and equipment B do not communicate with the application terminal via the local area network any longer.

In S713, the application terminal transmits a request for obtaining application terminal's equipment list to the server and the server returns the application terminal's equipment list to the application terminal in S714. The application terminal may execute S713 and S714 to obtain the application terminal's equipment list. For example, it may obtain the application terminal's equipment list immediately after the application terminal registers with the server, or may also execute S713 to S714 periodically to obtain the newest equipment list of the application terminal.

Furthermore, when the application terminal's equipment list is saved in the application terminal, s713 to S714 may be omitted.

In S715, the application terminal transmits a request for obtaining information on equipments currently connected to the gateway to the gateway, and in S716, the gateway returns information on (one or more) equipments currently connected to the gateway to the application terminal. Then, at the application terminal, in S717, the application terminal determines whether one or more equipments currently connected to the gateway are included in the application terminal's equipment list. If so, in S718, network connection of the application terminal is controlled to be in off state, namely, remaining disconnected network connection of the application terminal. If not, in S719, the network connection of the application terminal is controlled to be in on state, namely turning on the network connection.

It is possible to execute the process of S715 to S717 periodically to detect equipments connected to the gateway continuously. It is possible to set a predetermined time interval in the application terminal for which S715 to S717 is executed periodically.

As described before, in S717, it is possible to disconnect the network connection of the application terminal when at least one equipment in the application terminal's equipment list is connected, and it is also possible to disconnect the network connection of the application terminal when all equipments in the application terminal's equipment list are connected.

Therefore, it can be seen that according to the embodiment of the present disclosure, when equipments and the application terminal are not in the same local area network, it is possible to turn on the network connection of the application terminal.

Furthermore, those skilled in the art can understand that the case in which an equipment leaves the local area network to which the application terminal belongs is also applicable to the implementation in which the gateway determines whether the connected equipments and the application terminal belong to the same local area network and the case in which short-range communication between the equipment and the application terminal is disconnected, which will not described any more here.

Figure 8:
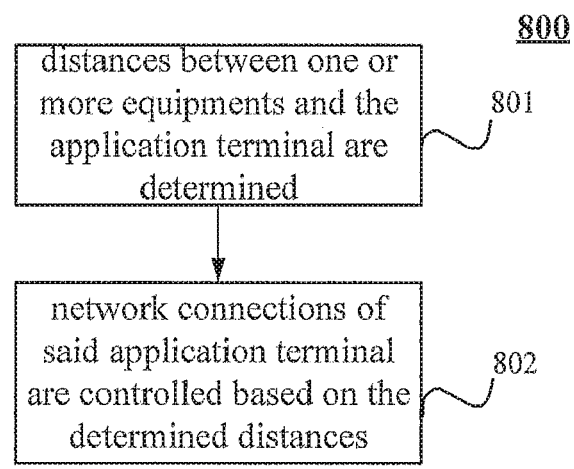
FIG. 8 shows a schematic flow chart of a method for controlling network connection of an application terminal according to another embodiment of the present disclosure.

FIG. 8 shows a schematic flow chart of a method 800 for controlling network connection of an application terminal according to another embodiment of the present disclosure. The method 800 may be executed at the gateway or the application terminal.

As shown in FIG. 8, in 801 of the method 800, distances between one or more equipments and the application terminal are determined. And in 802, network connections of said application terminal are controlled based on the determined distances.

Therefore, according to embodiments of the present disclosure, when a distance between an equipment and the application terminal is short enough, although the equipment is not connected to the local area network to which the application terminal belongs and not performing short-range communication with the application terminal, it is still possible to disconnect network connection of the application terminal rather than always connecting the application terminal with the network, thereby reducing the risk of leaking user's data.

In one example, controlling the application terminal's network connection includes controlling said application terminal's network connection to be in off state or on state based on the determined distance.

In one example, when the distance is less than or equal to a predetermined threshold, the network connection of the application terminal is disconnected.

In one example, the one or more equipments may be equipments that has never established connection with the application terminal.

In one example, the one or more equipments are equipments in the application terminal's equipment list.

In one example, the method 800 further includes: Determining whether said one or more equipments are equipments in the application terminal's equipment list.

As described before, when determining whether one or more equipments are those in the application terminal equipment list, it is possible to determine whether information on said one or more equipments is included in the application terminal equipment list and when the information on the equipments is included in the application terminal equipment list, determining the equipments are those in the application terminal equipment list.

Before determining whether information on said one or more equipments is included in the application terminal's equipment list, it is also possible to obtain information on said one or more equipments and obtain the application terminal's equipment list.

As described before, in one example, when at least one in said one or more equipments is one in the application terminal equipment list, the network connection of the application terminal is disconnected. For example, the at least one equipment may be any one equipment in the application terminal's equipment list, or may be a specified equipment in the preset equipment list of the application terminal.

Furthermore, in one example, when distances between all equipments in the application terminal's equipment list and the application terminal are less than or equal to a preset threshold, the network connection of the application terminal is disconnected.

The preset threshold may be a default value, or may be changed manually by the user, for example, several meters or tens of meters.

In one example, after disconnecting the network connection of the application terminal, when a distance between at least one of equipments in the application terminal's equipment list and the application terminal is greater than a predetermined threshold, the network connection of the application terminal is controlled to be in on state. For example, it is possible to configure such that as long as a distance between one equipment in the application terminal's equipment list and the application terminal is greater than a predetermined threshold, the network connection of the application terminal is in on state. Furthermore, it is also possible to set a threshold number, and when distances between a number exceeding the threshold number of equipments in the application terminal's equipment list and the application terminal are greater than a predetermined threshold, the network connection of the application terminal is in on state. Furthermore, it is also possible to set one or more equipments in the terminal's equipment list as specified equipments, and when distances between the specified equipments and the application terminal are greater than the predetermined threshold, the network connection of the application terminal is in On state regardless whether other equipments are connected.

In another example, when distances between all equipments in the application terminal's equipment list and the application terminal are greater than a predetermined threshold, the network connection of the application terminal is controlled to be in On state.

In one example, it is possible to obtain information on respective equipment from said one or more equipments, such as the equipment name, identifier, MAC address etc. of the equipment.

In one example, it is possible to save said application terminal's equipment list at the server.

In one example, it is possible to save said application terminal's equipment list in the mobile terminal.

Figure 9:
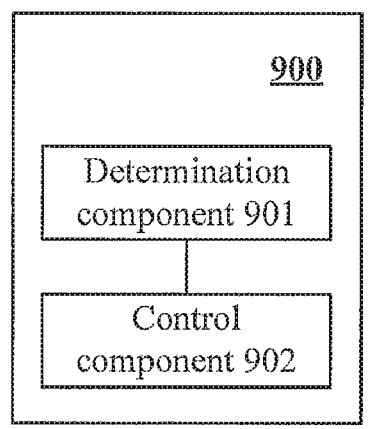
FIG. 9 shows a schematic block diagram of a device for controlling network connection of an application terminal according to an embodiment of the present disclosure.

FIG. 9 shows a schematic block diagram of a device 900 for controlling network connection of an application terminal according to an embodiment of the present disclosure. It is possible to implement the device 900 on the gateway or the application terminal.

As shown in FIG. 9, the device 900 includes a determination component 901 and a control component 902. The determination component 901 is configured to determine whether one or more connected equipments are those in the application terminal's equipment list, and the control component 902 is configured to control network connection of the application terminal based on the determined result.

Therefore, according to embodiments of the present disclosure, by detecting whether the equipment connected with the application terminal is in the application terminal equipment list, when the equipment is in the same local area network as the application terminal or the equipment is in short-range communication with the application terminal, it is possible to control the application terminal's network connection rather than always connecting the application terminal with the network, thereby reducing the risk of leaking the user's data.

In one example, the determination component 901 determines whether information on said one or more equipments is included in the application terminal's equipment list, and determines that the equipment is the one in the application terminal's equipment list if the information on the equipment is included in the application terminal's equipment list.

In another example, the determination component 901 further obtains information on one or more connected equipments and obtains the application terminal's equipment list.

In one example, the control component 902 controls the network connection of said application terminal to be in Off or On state based on the determination result.

In one example, when the determination component 901 determines at least one of one or more connected equipments are those in the application terminal's equipment list, the control component 902 disconnects the network connection of the application terminal.

In one example, when the determination component 901 determines that all equipments in the application terminal's equipment list are connected, the control component 902 disconnects the network connection of the application terminal.

In one example, after the control component 902 disconnects the network connection of the application terminal, when the determination component 901 determines at least one of equipments in the application terminal's equipment list are not connected, the control component 902 controls the network connection of the application terminal to be in On state.

In one example, when the determination component 901 determines that all equipments in the application terminal's equipment list are not connected, the control component 902 controls the network connection of the application terminal to to in On state.

In one example, information on said one or more connected equipments is kept at the gateway.

In one example, information on said one or more connected equipments is kept at the application terminal.

In one example, said application terminal's equipment list is saved at the server.

In one example, said application terminal's equipment list is saved at the application terminal.

In one example, one or more connected equipments are connected with the application terminal via a local area network or short-range communication.

Those skilled in the art may appreciate that units and algorithm steps of examples described in embodiments disclosed in the present description can be implemented by electronic hardware, computer software or combination thereof, and in order to clearly describe interchangeability between hardware and software, constitutions and steps of examples have been described generally in the above description. Whether these functions are implemented in hardware or software depends on specific application and design constraints of the technical proposal. Those skilled in the art can implement described functions with different methods for each specific application. However this implementation should not be considered to be beyond the scope of the present disclosure.

The above are only specific implementations of the present disclosure. However the scope of the present disclosure is not limited thereto. Variations or substitutions that easily occur to any one skilled in the art within the technical scope disclosed in the present disclosure should be encompassed in the scope of the present disclosure. Therefore, the scope of the present disclosure should be based on the scope of the claims.

The present application claims the priority of the Chinese Patent Application No. 201610128394.8 filed on Mar. 7, 2016, which is incorporated herein in its entirety by reference as part of the disclosure of the present application.

The invention claimed is:

1. A method for controlling a network connection of an application terminal, comprising: determining whether one or more connected equipments are equipments in the application terminal's equipment list, said application terminal's equipment list is the list of all equipments associated with the application terminal, wherein the one or more connected equipments are connected with the application terminal within a same local area network though a gateway; and controlling the network connection of the application terminal based on the determination result, wherein when at least one in the one or more connected equipments are equipments in the application terminal's equipment list, the network connection between the application terminal and the gateway is disconnected; and after the disconnecting the network connection of the application terminal, when at least one of equipments in the application terminal's equipment list is not connected, controlling the network connection of the application terminal to be in On state.

2. The method according to claim 1, wherein the determining whether one or more connected equipments are equipments in the application terminal's equipment list comprises: determining whether information on the one or more equipments is included in the application terminal's equipment list; and when information on the equipments is included in the application terminal's equipment list, determining that the equipments are equipments in the application terminal's equipment list.

3. The method according to claim 2, further comprising: obtaining information on one or more connected equipments; and obtaining the application terminal's equipment list.

4. The method according to claim 1, wherein controlling the application terminal's network connection comprises controlling the application terminal's network connection to be in Off state or On state based on the determination result.

5. The method according to claim 1, wherein when all equipments in the application terminal's equipment list are connected, the network connection of the application terminal is disconnected.

6. The method according to claim 1, wherein when all equipments in the application terminal's equipment list are not connected, controlling the network connection of the application terminal to be in On state.

7. The method according to claim 1, wherein information on the one or more connected equipments is saved at a gateway.

8. The method according to claim 1, wherein information on the one or more connected equipments is kept at the application terminal.

9. The method according to claim 1, wherein the application terminal's equipment list is saved at a server.

10. The method according to claim 1, wherein the application terminal's equipment list is saved in the application terminal.

11. The method according to claim 1, wherein the method is executed at the gateway.

12. The method according to claim 1, wherein the method is executed at the application terminal.

13. The method according to claim 1, wherein said equipments are mobile equipments or equipments of Internet of Things.

14. A system for controlling a network connection of an application terminal, comprising:
a server configured to determine whether one or more connected equipments are equipments in the application terminal's equipment list, said application terminal's equipment list is the list of all equipments associated with the application terminal, wherein the one or more connected equipments are connected with the application terminal within a same local area network though a gateway; and
wherein the server is configured for controlling the network connection of the application terminal based on the determination result,
wherein when the server determines that at least one in the one or more connected equipments are equipments in the application terminal's equipment list, the server determines that the network connection between the application terminal and the gateway is disconnected; and after the disconnecting the network connection of the application terminal, when at least one of equipments in the application terminal's equipment list is not connected, controlling the network connection of the application terminal to be in On state.

15. A non-transitory computer-readable medium for controlling a network connection of an application terminal comprising instructions stored thereon, that when executed on a processor, perform the steps of:
determining whether one or more connected equipments are equipments in the application terminal's equipment list, said application terminal's equipment list is the list of all equipments associated with the application terminal, wherein the one or more connected equipments are connected with the application terminal within a same local area network though a gateway; and
controlling the network connection of the application terminal based on the determination result, wherein when at least one in the one or more connected equipments are equipments in the application terminal's equipment list, the network connection between the application terminal and the gateway is disconnected; and after the disconnecting the network connection of the application terminal, when at least one of equipments in the application terminal's equipment list is not connected, controlling the network connection of the application terminal to be in On state.

* * * * *